(12) United States Patent
Leiber et al.

(10) Patent No.: US 8,400,043 B2
(45) Date of Patent: Mar. 19, 2013

(54) STATOR FOR ELECTRIC MOTOR (75) Inventors: Thomas Leiber, München (DE);
Valentin Unterfrauner, Feldthurns (IT);
Nico Windecker, Zorneding (DE)

(73) Assignee: CPM Compact Power Motors GmbH, Unterfohring (DE)

( * ) Notice: Subject to any disclaimer, the term of this patent is extended or adjusted under 35 U.S.C. 154(b) by 263 days.

(21) Appl. No.: 12/674,204

(22) PCT Filed: Feb. 19, 2008

(86) PCT No.: PCT/EP2008/001276
§ 371 (c)(1),
(2), (4) Date: Feb. 19, 2010

(87) PCT Pub. No.: WO2009/006951
PCT Pub. Date: Jan. 15, 2009

(65) Prior Publication Data
US 2011/0037338 A1     Feb. 17, 2011

(30) Foreign Application Priority Data
Jul. 12, 2007   (DE) .................. 10 2007 032 872

(51) Int. Cl.
*H02K 3/34* (2006.01)
(52) U.S. Cl. ...................................................... 310/215
(58) Field of Classification Search .................. 310/214, 310/215, 216.001–216.133; 29/596
See application file for complete search history.

(56) References Cited

U.S. PATENT DOCUMENTS

| | | | |
|---|---|---|---|
| 4,350,914 A * | 9/1982 | Searle | 310/194 |
| 6,081,059 A * | 6/2000 | Hsu | 310/179 |
| 6,876,118 B2 * | 4/2005 | Enomoto et al. | 310/180 |
| 2003/0155834 A1 | 8/2003 | Enomoto et al. | |
| 2005/0242670 A1 | 11/2005 | Lee | |

FOREIGN PATENT DOCUMENTS

| | | |
|---|---|---|
| DE | 1763506 A1 | 11/1971 |
| DE | 19934858 A1 | 1/2001 |
| DE | 10259090 A1 | 7/2004 |
| JP | 61180563 A | 8/1986 |
| JP | 07245895 A | 9/1995 |
| JP | 08098440 A | 4/1996 |
| JP | 2000341897 A | 12/2000 |
| JP | 2001161048 A | 6/2001 |
| JP | 2003164089 A | 6/2003 |
| WO | WO-00/72426 A1 | 11/2000 |

* cited by examiner

*Primary Examiner* — Nguyen N Hanh
(74) *Attorney, Agent, or Firm* — Novak Druce Connolly Bove + Quigg LLP (57) ABSTRACT The invention relates to a stator with a plurality of field coils, wherein the yoke teeth, which bear the field coils, of the poles are connected with their free ends to a stator ring, and wherein adjacent pole shoes or poles are connected to one another.

13 Claims, 12 Drawing Sheets

STATOR FOR ELECTRIC MOTOR

CROSS-REFERENCE TO RELATED APPLICATIONS

This application is a 35 U.S.C. §371 National Stage Application of International Application No. PCT/EP2008/001276, filed Feb. 19, 2008, which claims priority from German Application No. 102007032872.0, filed Jul. 12, 2007, the entire contents of which are incorporated herein by reference.

The present invention [relates to] an embodiment of a stator for a polyphase machine according to the preamble of claim 1.

PRIOR ART

External rotor motors according to the prior art have a stator which is wound with coils, and also a rotor with embedded or adhesively bonded magnets. Pole shoes are generally provided in order, on the one hand, to reduce the detent torque of the motor and, on the other hand, to ensure that the coils are fixed in the stator. Pole shoes also have an advantageous effect on magnetic properties, as the flux of the permanent magnets can be conducted more effectively into the stator.

The advantages of the pole shoes lead to drawbacks in the winding of the stator. The needle or flyer winding is most widespread. Needle winding requires a needle which is guided in the groove in the yoke tooth and generally has a width of 2.5-3 times that of the wound wire. Motors for the low-voltage range, in particular, require thick wires in order to achieve a low number of turns and inductance. On account of the required width of the needle of the needle winder, a winding space corresponding to the diameter of the needle is lost during winding of the stator. Needle winding technology therefore generally allows only low copper fill factors of approx. 30-35% to be achieved. In order to achieve better fill factors, use is made of individual teeth which have dovetails and are connected in a form-fitting manner to a stator ring. The individual teeth are then wound individually and inserted into the stator. The drawback of the individual teeth is the high handling complexity. In addition, individual-tooth windings require a punched grid to which the coils are interconnected. The punched grid is a cost-pusher and should therefore be simplified.

In order to increase the copper fill factor, EP 0871282 A1 discloses a one-part stator having bending zones in the region of the return. This allows the stator to be wound in the straight state. After the winding, the stator is bent into a shape. This technique has the advantage of low material wastage and allows a high copper fill factor in internal rotor motors. However, a high fill factor cannot be achieved in external rotor motors (FIG. 49, EP 0871282 A1). In addition, the pole shoes are configured in a very complex manner in order to allow the deactivating of individual coils with an insulating body, as illustrated in FIGS. 13 and 14 of EP 0871282 A1.

OBJECT AND CARRYING-OUT OF THE INVENTION

The aim of the invention is to provide a stator for an electric motor with which, on the one hand, a high fill factor can be achieved and, on the other hand, the handling complexity and the costs can be reduced. Furthermore, the stator construction should have an advantageous effect on the detent torque of the motor and thus reduce the formation of noise.

This object is inventively achieved by a two-part stator construction having the features of claim 1 and has the following advantages:
- optimum configuration of the pole shoes with regard to minimising the detent torque;
- high flexibility as a result of the use of individual coils or alternatively the entire stator winding; achieving a high fill factor for external and internal rotor motors;
- low material wastage and handling complexity;
- low tolerance sensitivity of the stator parts;
- reduction of shunts by way of cut-outs;
- low manufacturing costs.

Further advantageous configurations of this stator and of a corresponding electric motor emerge from the features of the sub-claims.

Various configurations of the drive according to the invention will be described hereinafter with reference to the drawings, in which.

Figure 1:
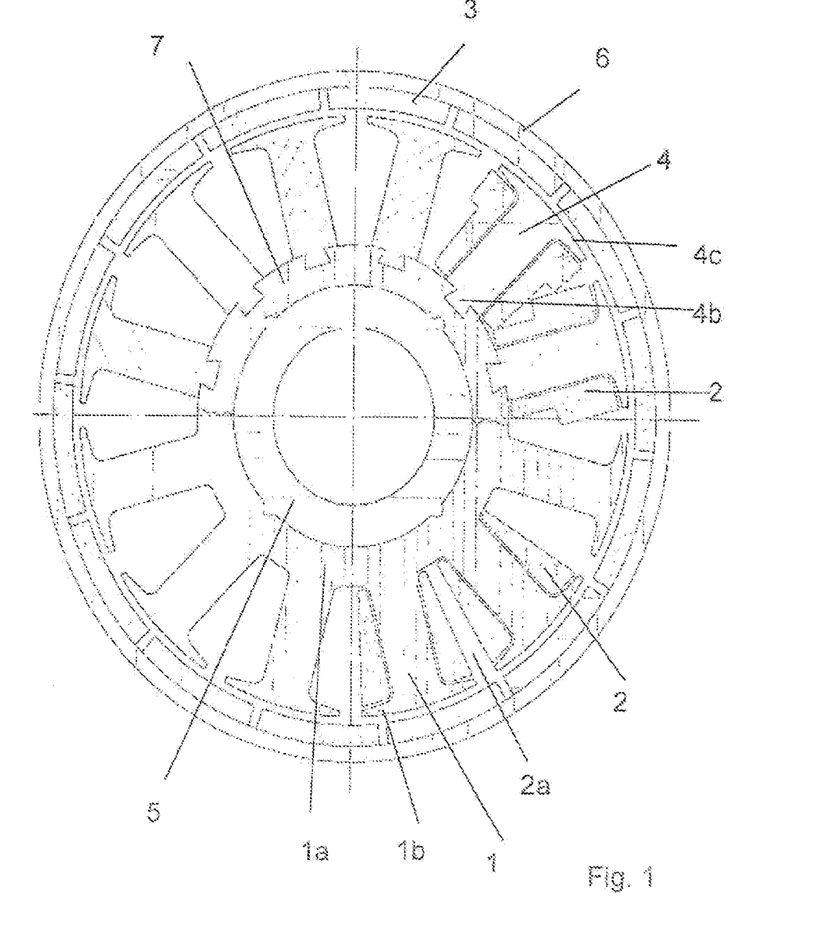
FIG. 1 shows stator construction of a polyphase machine according to the prior art.

FIG. 1 shows a cross section through a stator construction according to the prior art. The lower part of the picture shows a one-part stator having poles 1, a pole shoe formation 1b and a transverse flux region 1a. The excitation coils 2 are slid onto the stator. The dead space 2a, which cannot be wound, is positioned between the poles 1 and is obtained from the guidance of the needle and the width of the needle of the needle winder. The flux generated by the excitation coils 2 is closed via the permanent magnets 3 and the rotor 6. The upper part of the picture shows an alternative to the lower stator configuration. There, the stator is made up of a plurality of parts and consists of a stator ring 7 and a plurality of individual poles 4 which are individually wound with coils 2. The individual poles 4 are fixed in the stator ring 7 via a dovetail 4b. Generally, the stator cores are held together via a press fit and caulking. This embodiment of the stator requires stringent demands to be placed on the dimensional stability of the laminated cores for the individual poles 4 and the ring 7, as a result of which the production costs are high. The stator is connected to the carrier 5, which is a part of the motor housing, via grooves or via a press fit.

Figure 2:
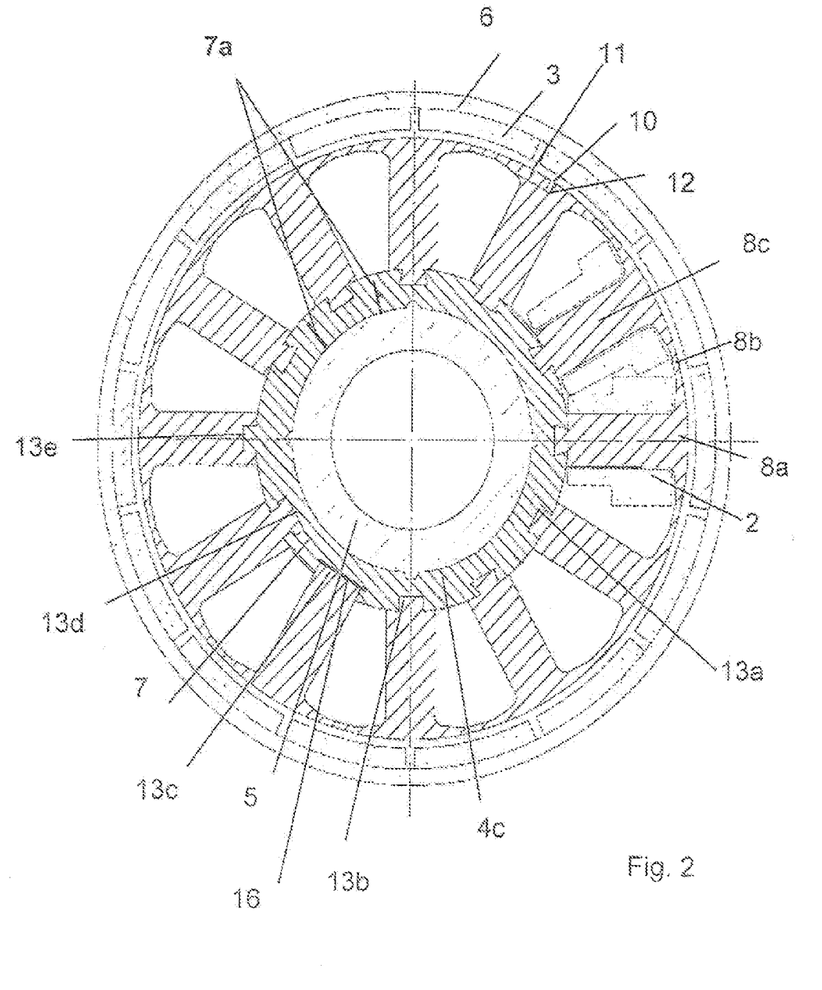
FIG. 2 shows stator construction according to the invention for external rotor motor in the assembled state.

FIG. 2 shows the stator construction according to the invention for an external rotor motor. The stator consists of 2 parts: a stator ring 7 and a stator 8 bent into a round shape. The stator 8 has dovetails 13a and a connecting web 8b connecting the individual yoke teeth 8c.

The stator is wound with excitation coils 2 in unrolled form. The stator as a whole is thus insulated and wound before it is bent and attached to the stator ring 8. It is particularly advantageous in this regard that the stator can be wound as a whole, i.e. a plurality of coils of a phase circuit is wound onto the stator in one step. This eliminates the need for individual coil winding. This greatly simplifies the punched grid connecting the individual coils, as fewer coil wires are to be contacted in a series winding of the stator. In addition, the demands placed on the precision of the dimensional stability of the dovetails are less stringent compared to the prior art (FIG. 1), as the stator core is a coherent whole and it is not necessary for each tooth to achieve an optimum press connection between the tooth and stator ring. Shoulders 13b, 13c and 13d and 13e, which merely ensure positioning of the stator in the ring, are therefore conceivable alternatives to the dovetail. The stator can then be connected in a form-fitting manner to the stator ring 7 by end-side welding 16 in the region of the connection between the stator 8 and stator ring 7. In order to save material costs, a configuration of the stator, inner ring 7 as a flexible part is possible. In order to ensure this, appropriate bending zones 7a are provided in the stator inner ring. The stator inner ring can then be cut out, using little material, as a straight part from a lamination strip and be connected to the stator carrier 5 via appropriate form-fitting connections (not shown).

The stator form is configured in such a way that an overlap region 11 is obtained in the region of the centre of the yoke tooth 8c or pole shoe 8a after the bending and fastening to the stator ring 7. An appropriate spacing 12 is provided so that the tolerance sensitivity of the stator can be reduced. There, the stator is for example closed by a weld seam 10.

A form-fitting connection (not shown) of the bending stator, by means of which the bending stator is closed and held together, is also possible as an alternative to the weld seam. In order to reduce eddy current losses, the free end 10 can also be connected to the adjoining tooth by adhesive bonding or caulking. The overlap region is advantageous at the centre of the yoke tooth 8c, as sufficient material is present for the weld seam and the magnetic properties are not markedly impaired.

The connecting web 8b between the poles 8 has an adverse effect on the magnetic properties, as a magnetic short circuit occurs. The walls of the connecting zone should therefore be made as thin as possible so that the connecting web soon reaches saturation on excitation and the magnetic resistance is thus increased. However, at a different point, the closed stator has a positive effect on the motor properties, as the detent torque generated by the permanent magnets 3 is greatly reduced, as the magnets face a homogeneous, continuous stator contour. As a result, the tightening effect acting on the poles 8 is greatly weakened by the magnetisation of the magnets 3. This has an advantageous effect on the noise and also the smooth-running rotatability of the rotor in the currentless state. The latter property is particularly important in use in electric power steering, as a very low detent torque is required.

Figure 3A:
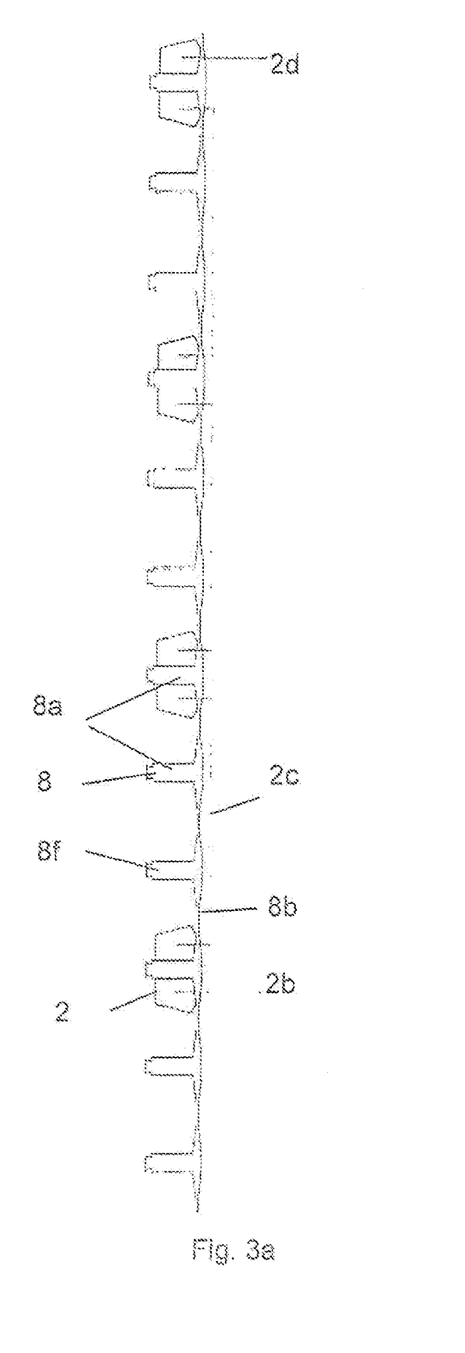
FIG. 3a shows stator construction according to the invention for external rotor motor as an individual part for winding coils.

FIG. 3a shows the stator 8 in unrolled form. The connecting zone 8b between the webs must be designed in such a way that the geometry of the material is kept appropriately stretched as a result of the bending. Thus, it may be advantageous for the geometry of the connecting web to have a defined bending/buckling zone or for the connecting region 8b to have a uniform thickness and for a secant thus to be formed as a result of bending. Furthermore, FIG. 3a shows an advantageous winding of the stator with excitation coils. The coils 2 are wound onto a first tooth via the phase access 2b; the wire is then extended further to the next tooth via the connection 2c until the complete phase is wound and ends at the output 2d. The output 2d is the outlet to the star connection. This winding technology greatly reduces the number of contacts, as a plurality of coils is wound in series. This allows the punched grid to be greatly simplified. In addition, fewer contacts lead to less wastage in production. It is also conceivable for the coils to be wound in series in a device and then to be attached to the stator. This is possible as the poles 8 are designed to be straight and the [ . . . ] at the free ends 8f of the yoke teeth is freely accessible. An external winding is advantageous, as the coils can be wound on an individual-tooth winder machine which is more economical than a needle winding machine. In addition, the wire can be wound in a more dimensionally accurate manner via a specific device. This allows, in turn, a higher copper fill factor.

Figure 3B:
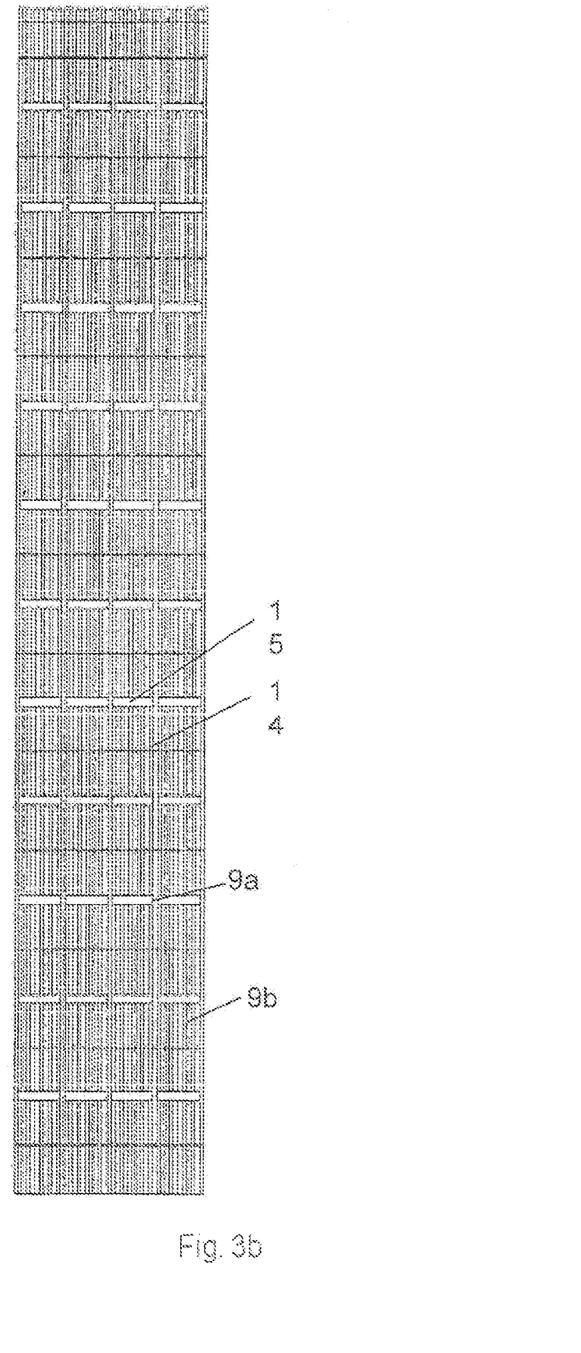
FIG. 3b is a plan view onto a stator core as an individual part.

FIG. 3b is a plan view onto the stator of a variant of the laminate cores from FIG. 3a. Thus, it is possible to assemble the stator from the same laminate cores and to achieve a continuous connecting web 8b between the poles 8. This is particularly advantageous for reducing the detent torque, but leads to a magnetic short circuit and thus to losses in the development of forces.

In so far as the detent torque is therefore not particularly important, it is advantageous for the stator core to be composed of a composite of individual-tooth laminations 9b and continuous laminations 9a. It is thus possible to reduce the proportion of the height of the stator core that is made up by the connecting webs; this reduces the magnetic short circuit between the poles while at the same time allowing a one-part stator. The stator cores can be connected to one another by welding 14, by adhesive bonding or punch coring. Alternatively, it is also conceivable for the stator to be punched out in the region 15, so that the magnetic short circuit is minimised between the stator teeth.

Figure 3C:
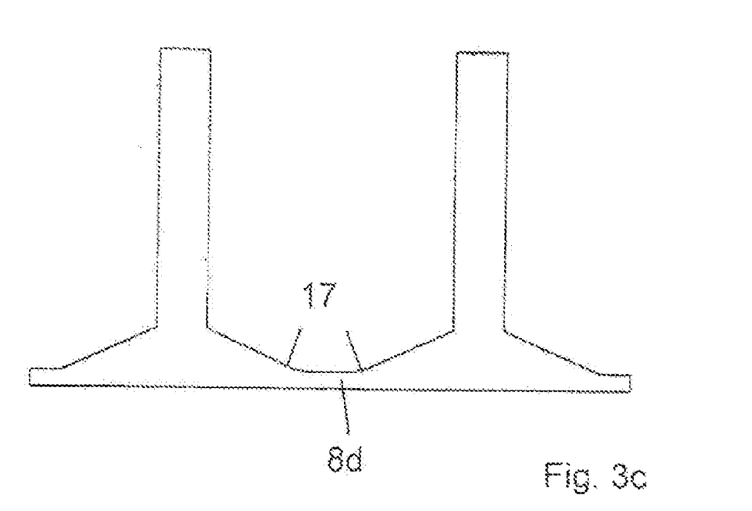
FIGS. 3c-3f show various embodiments of the connecting webs of the yoke teeth.
Figure 3D:
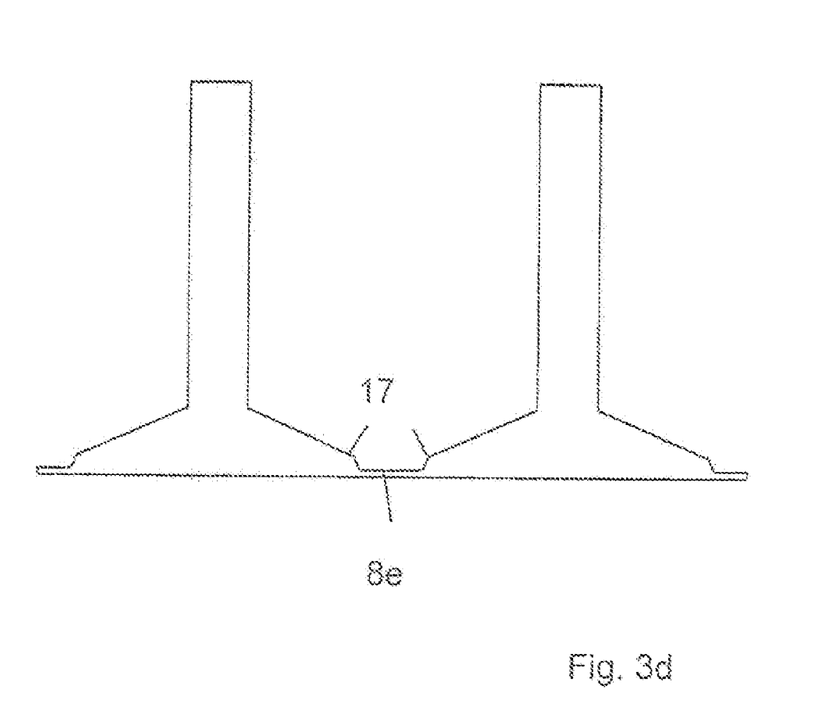
Figure 3E:
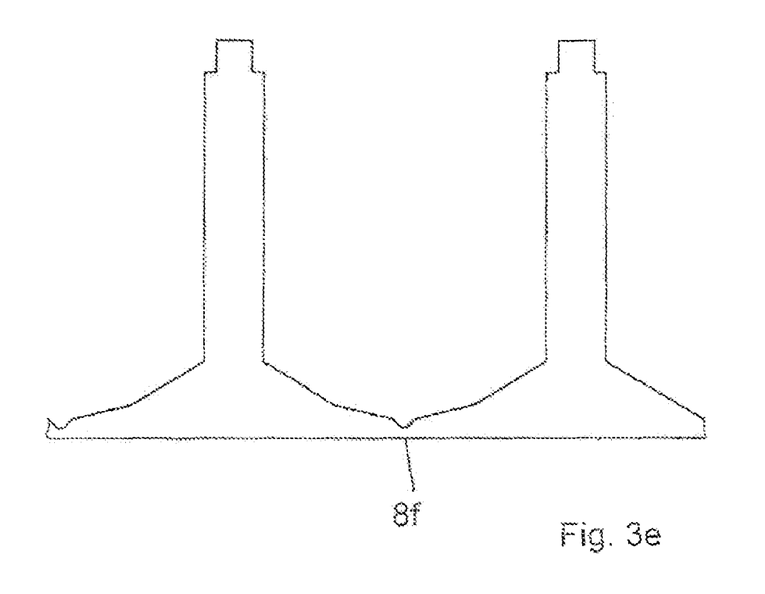
Figure 3F:
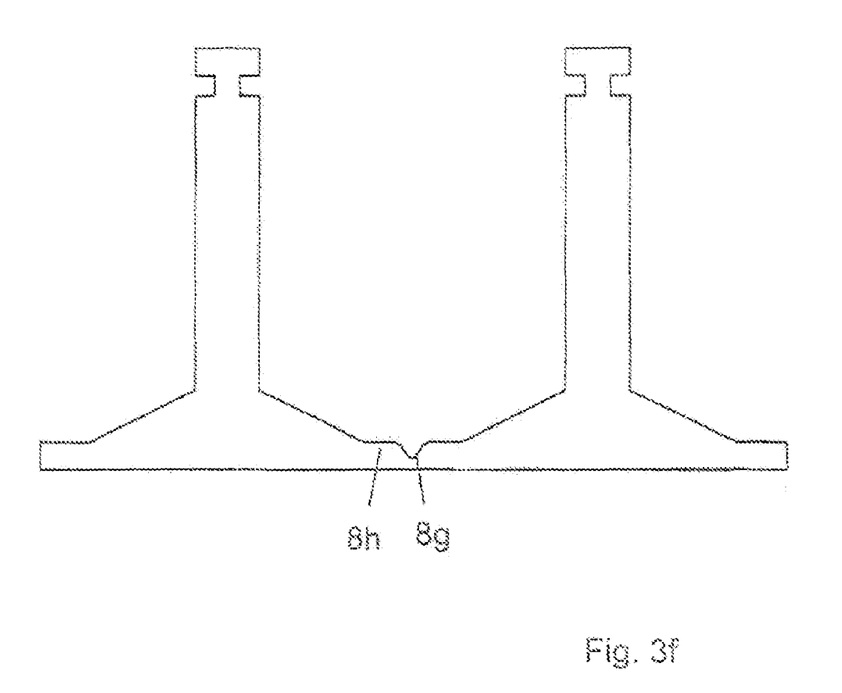

FIG. 3c to FIG. 3f show various variants of the connection between the stator and stator ring and various zones of transition between the individual yoke teeth 8c. In FIG. 3c, the transition region 8c is designed so as to be continuous and have a uniform thickness. In this case, the connecting region 8d is not designed for minimum thickness. This reduces the demands placed on the punching tool. However, the magnetic shunt can be effectively minimised by appropriate cut-outs between the yoke teeth. The bending is carried out on the zones 17; a secant is formed in the bent state. In FIG. 3d, the connecting region is designed in a very thin-walled manner. This is expedient if cut-outs are to be dispensed with. In this case, the minimum thickness is that which can be economically achieved using a punching tool; generally, the thickness of the connecting region should be between 0.5 and 1 mm. In FIG. 3e, the pole shoe tapers toward a defined bending zone 8f at 2 angles. This allows a defined bending zone. FIG. 3f is designed in a similar manner, with the difference that the connecting region between the poles has a uniform wall in a region 8h and is then tapered via a defined bending zone 8g. Which embodiment is most suitable in the individual case depends on the specific design of the motor. The important thing is that the connecting region between the poles is very thin-walled, or the magnetic short circuit is reduced by cut-outs between the poles.

Figure 4:
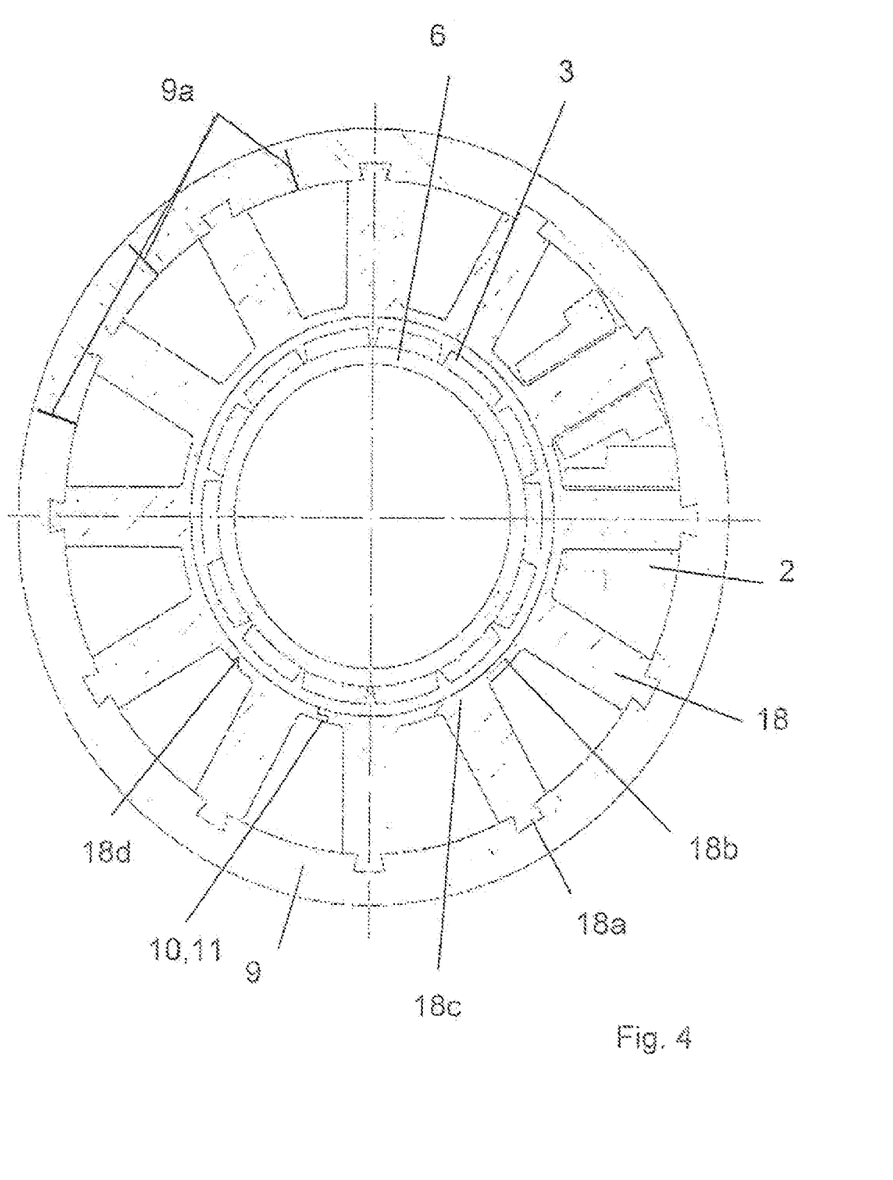
FIG. 4 shows stator construction according to the invention for internal rotor motor.

FIG. 4 shows a similar stator for an internal rotor motor. The stator consists, again, of 2 parts. The first part of the stator core 18 with yoke teeth 18c, poles 18a, a dovetail 18s and a thin-walled connecting zone 18b carries the excitation coils 2. This part is connected to the stator ring 9 via dovetails or shoulders 18s which are comparable to the connections shown in FIG. 2. The permanent magnets 3, which are adhesively bonded or embedded on the rotor 6, face the poles 18a. In this case, the stator can be brought from a straight unwound form (cf. FIG. 3a) into the corresponding round form by bending round and connecting the stator ends (2s) or, alternatively, be manufactured as a punched core in round form without bending. In the latter variant, it is advantageous for the excitation coils 2, as illustrated in FIG. 3a, to be wound beforehand and attached to the stator. Direct winding of the stator is also possible. A higher fill factor is possible in this case too, as better filling of the needle of the needle winder is possible. It is also advantageous for the stator to have, in the region of the connecting webs 18b, an appropriate bending zone 18d (cf. with FIGS. 3c-3d). This allows the stator to be manufactured in straight form with minimal material wastage and to be shaped by bending back. The free ends 11 are overlapped with one another and welded to one another by means of a weld seam 10. In the bent-back state, the stator can then be optimally wound on an appropriate device with a needle winder. In order to save material costs, a configuration of the stator outer ring 9 as a flexible part is possible. In order to ensure this, appropriate bending zones 9a are provided in the stator outer ring 9. The stator outer ring can then be cut out, using little material, as a straight part from a lamination strip and be connected to the bending stator 18 via form-fitting connections 18a.

Figure 5A:
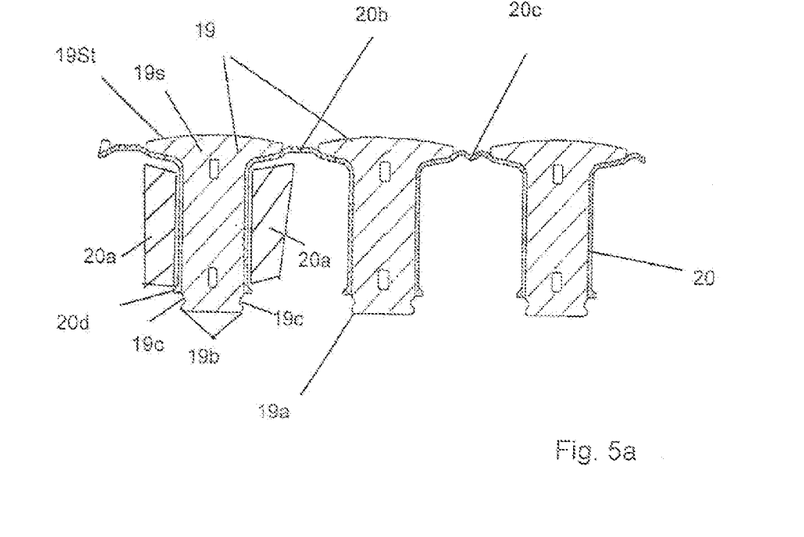
FIG. 5 shows alternative toothed connection with plastics material encapsulation.

FIG. 5a shows an alternative embodiment in which the poles are connected to one another using plastics material. In this case, in one embodiment, the individual teeth 19 are encapsulated in a suitable device in a form such that all the teeth of the stator are connected to one another. The encapsulation 20, on the one hand, insulates the tooth for the winding 20a and has a pliable zone 20b in the connections of the individual teeth. In order to ensure greater flexibility, the pliable zone 20b can be embodied in an undulatory manner, in particular with a loop 20c, thus improving the elasticity of the bending. The base 19a of the tooth has an appropriate polygonal geometry, in particular with projections 19b and/or undercuts 19c which extend in the axial direction and allow a form-fitting connection to the stator inner ring 7. An axially extending shoulder or web 20d, which ensures that the coils (20a) are fixed in the appropriate form during winding and do not slip off from the carrier, is provided for the purposes of winding. This type of connection can be provided both for a stator of an internal rotor motor (FIG. 4) and for a stator of an external rotor motor (FIG. 2).

Figure 5B:
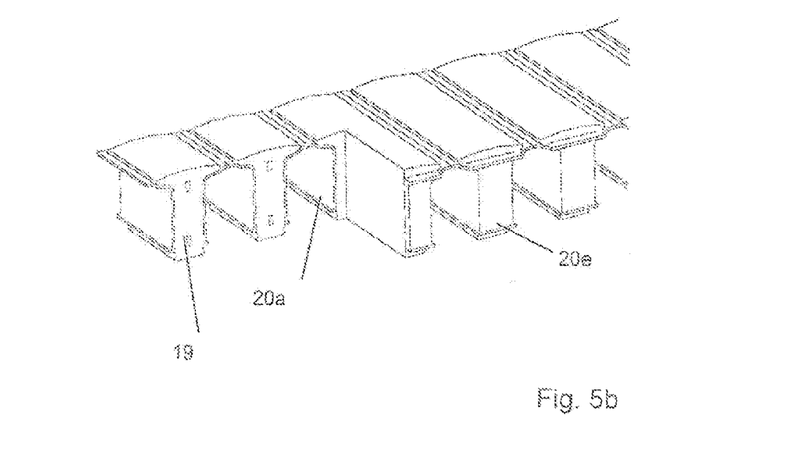
FIG. 5b is a 3D sectional illustration of alternative toothed connection with plastics material encapsulation.

FIG. 5b shows a 3D section through the encapsulation. In the encapsulation, it is advantageous for an encapsulation 20e to be provided at the end side. It is beneficial to design the end-side encapsulation in such a way that the excitation coils are guided and fixed during winding in plastics material guides which are provided.

Figure 6:
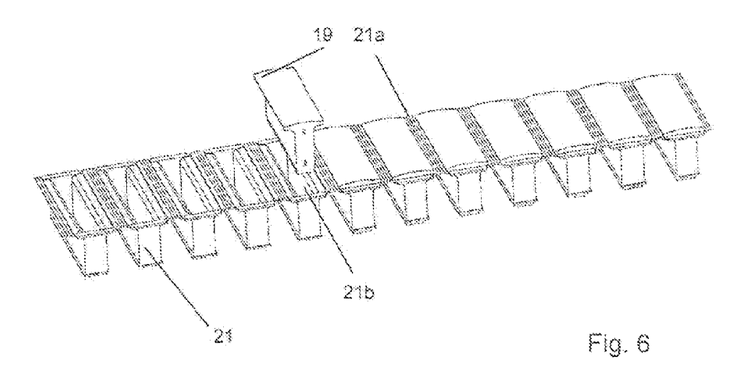
FIG. 6 shows linear stator made up of a plastics material ladder with inserted individual teeth.

FIG. 6 shows an alternative to plastics material encapsulation. In this embodiment, the individual teeth 19 are inserted into a prefabricated plastics material part the form of a ladder 21. The plastics material ladder 21 serves, on the one hand, as a stator insulator; on the other hand, it, like the plastics material encapsulation illustrated in FIG. 5a, has a pliable zone 21'a. A configuration of the plastics material ladder 21 that allows the teeth 19 to be clipped into pockets 21b is advantageous. The clipping-in can be carried out by means of snap-in connections (not shown) which can be formed by appropriate undercuts, projections and/or tongues on the parts 19 and 21.

The ladder solution can be used for the stator design of both an internal and an external rotor motor.

The plastics material connection variants illustrated in FIGS. 5-6 have the advantage that it is necessary to produce only stator teeth 19 and not lamination strips for the connecting webs. The manufacture of the teeth and also the stator coring process are thus much more economical. Drawbacks include the increased demands placed on the form-fitting connection of the bending stator to the stator ring 7, 9, as the bending stator cannot be efficiently held together by the plastics material connections.

Figure 7:
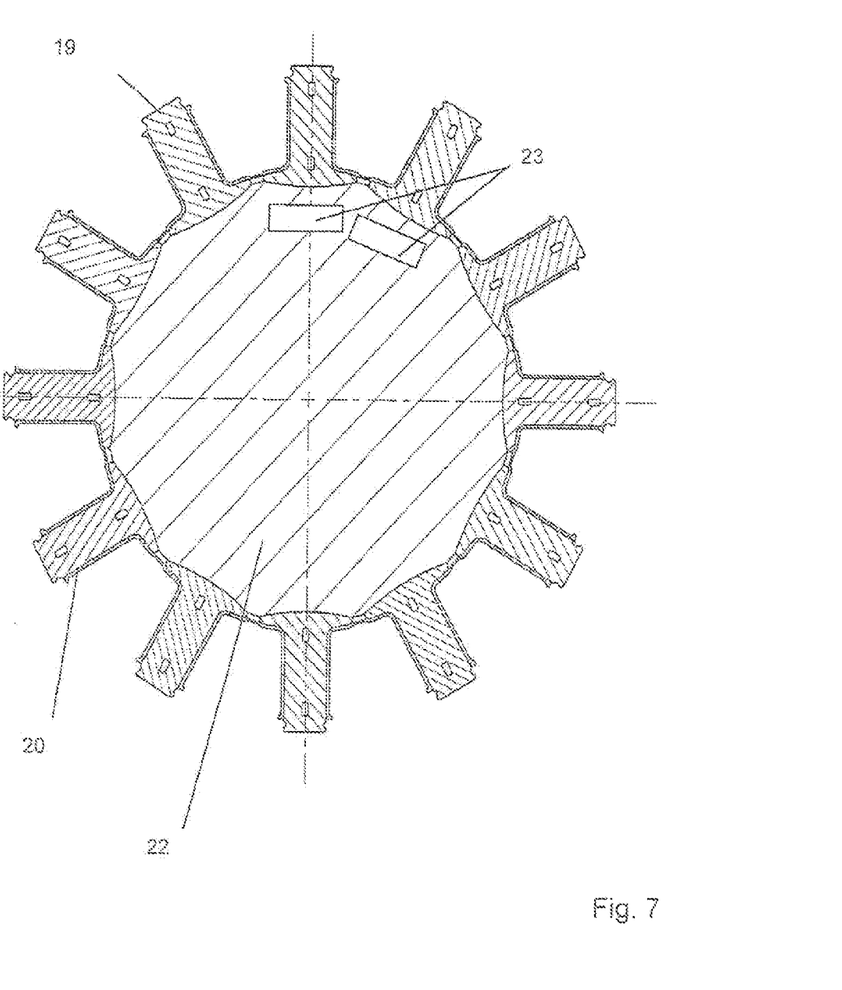
FIG. 7 shows winding tool receptacle for stator of an external rotor motor.

The stator can then be wound by a linear winding machine or be bent back and wound onto an appropriate Stator winding tool. The bending zone 20b, 20c, 21a must therefore be designed in such a way as to be able to ensure a first bend onto the carrier of the winding machine and also a second band in the opposite direction for insertion into the stator carrier ring. The stator fastened to the winding tool 22 is shown in FIG. 7. The teeth of the bent-back stator are tightened using magnetic force, for example using permanent magnets 23, for the purposes of winding and if appropriate fixed in the winding tool 22 via an additional clamping device (not shown).

Figure 7A:
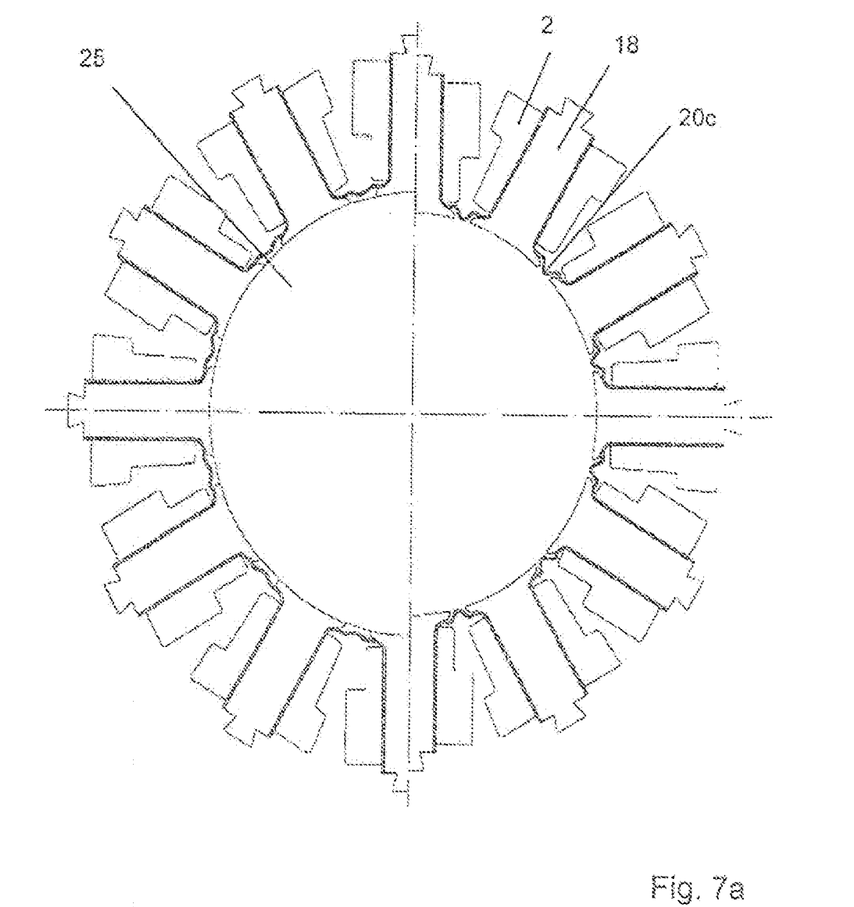
FIG. 7a shows winding tool receptacle for stator of an internal rotor motor.

FIG. 7a shows an appropriate winding tool for the stator of an internal rotor motor. In order to achieve a very good fill factor, it is beneficial for the stator 18 to be spread via a winding mandrel 25. The plastics material connecting webs, which are advantageously designed via an extensible loop 20c, are then extended, thereby creating the appropriate clearance for the needle of the needle winder. This allows the fill factor to be advantageously increased during automated winding. An elliptical configuration of the winding mandrel, which is rotated during winding, is also possible. As a result, the connecting zone between the teeth is also stretched and an appropriate clearance is produced for the guidance of the needle.

Figure 8:
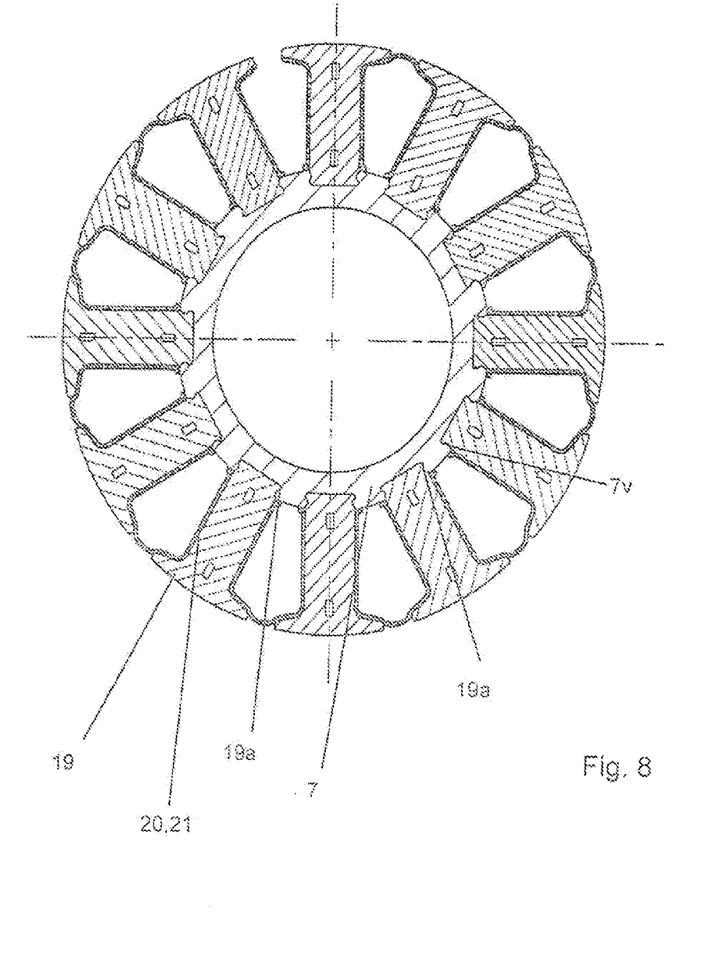
FIG. 8 shows assembled stator of an external rotor motor with plastics material encapsulation.

Once the encapsulated bending stator 20 or the individual teeth 19 embedded into a plastics material ladder 21 are wound, the bending stator is connected in a form-fitting manner to the stator ring 7 via a suitable device. For this purpose, the teeth 19 are inserted in the axial direction with their ends 19a into the appropriate recesses in the stator ring 7. The assembled stator is shown in FIG. 8.

Figure 9:
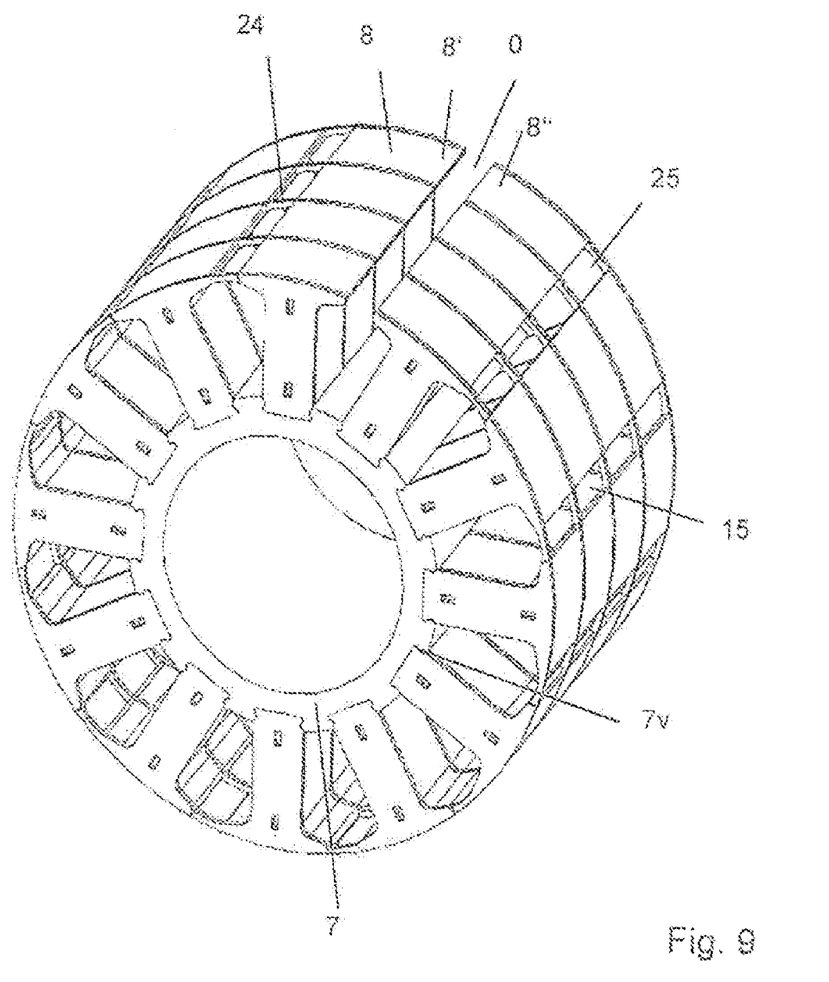
FIG. 9 shows assembled stator of an external rotor motor with pliable connecting zones made of metal with form-fitting connection to stator ring.

FIG. 9 shows the form-fitting connection variant of the bending stator with apertures without plastics material. The form-fitting connection 7v, 19a of the teeth 19 to the inner ring 7 imparts sufficient stability to the individual teeth 19. A connection, in particular a welding or a form-fitting connection, of the free ends 8', 8" of the bending stator 8 in the circumferential direction at O, as in the embodiment illustrated in FIG. 2, may therefore be dispensed with.

The invention claimed is:

1. A stator for an electric motor with an external rotor, the stator including:
 a plurality of excitation coils,
 poles having yoke teeth configured to carry the excitation coils, wherein the poles are initially unconnected to each other,
 an inner stator ring, wherein free ends of the yoke teeth of the poles are connected the inner stator ring, and
 a one-piece plastic material part including connecting regions, wherein the poles and/or pole shoes are connected to one another by means of the connecting regions, the connecting regions being embodied in a flexible and/or springy manner, wherein the poles lie in pockets of the one-piece plastic material part, and wherein the poles are fastened in the pockets by snap-in connections.

2. The stator according to claim 1, wherein plastics material sheathing the poles and/or pole shoes has projections for fixing the stator winding, which projections are formed in particular by axial webs or projections.

3. The stator according to claim 1, wherein the connecting regions have buckling or bending regions or are embodied as buckling or bending regions.

4. The stator according to claim 1, wherein the yoke teeth of the poles lie with their free ends in grooves in the inner stator ring.

5. The stator according to claim 4, wherein the yoke teeth of the poles have a pole shoe, a yoke teeth neck and a dovetail at their ends, and wherein the dovetail extends out of the pockets and the pole shoes rest on the one-piece plastics material part.

6. The stator according to claim 1, wherein the inner stator ring has radial projections which engage with corresponding cut-outs.

7. The stator according to claim 6, wherein the cut-outs comprise grooves in the free ends of the yoke teeth.

8. The stator according to claim 1, wherein the connecting region between the pole shoes is embodied, in a thin-walled manner.

9. A method for manufacturing a stator according to claim 1, the method including:
   inserting the yoke teeth and locking the yoke teeth in pockets of the plastic material part,
   attaching the stator winding to the pole teeth after said inserting and locking, and
   subsequently sliding the poles onto a stator ring.

10. The method for manufacturing a stator according to claim 9, wherein, prior to winding-on of the stator winding, the stator is bent in such a way as to produce a relatively large free space between the yoke teeth.

11. The method for manufacturing a stator according to claim 10, wherein the bent stator is mounted onto a winding mandrel.

12. The method for manufacturing a stator according to claim 11, wherein the bent stator is held on the winding mandrel by means of magnetic force.

13. The method for manufacturing a stator according to claim 10, wherein a winding mandrel radially spreads the suitor during the winding process the connecting regions being embodied in an extensible manner so that the poles are not deformed during spreading.

* * * * *